United States Patent [19]

Gabriel

[11] 4,074,113
[45] Feb. 14, 1978

[54] PUNCHED-CARD PROGRAMMABLE ANALOG COMPUTER

[76] Inventor: Edwin Zenith Gabriel, 318-B South St., Eatontown, N.J. 07724

[21] Appl. No.: 650,255

[22] Filed: Jan. 19, 1976

[51] Int. Cl.² .................. G06G 7/06; G06G 7/48; G09B 23/02
[52] U.S. Cl. ........................... 235/419; 364/810
[58] Field of Search ............ 235/61.11 E, 61.6, 184, 235/193, 180

[56] References Cited

U.S. PATENT DOCUMENTS

| | | | |
|---|---|---|---|
| 3,376,553 | 4/1968 | Neddenriep | 340/172.5 |
| 3,643,066 | 2/1972 | Coliz et al. | 235/61.11 E |
| 3,812,347 | 5/1974 | Cunningham et al. | 235/61.11 E |
| 3,849,660 | 11/1974 | Hommerin | 235/61.11 E |
| 3,918,028 | 11/1975 | Humphrey et al. | 235/61.11 E |

*Primary Examiner*—Vincent P. Canney

[57] ABSTRACT

To satisfy the need for an easily programmable portable analog computer, a compact, punched-card programmable computer is herein described. This compact computer may be programmed three different ways: 1. using conventional patch cords; 2. using mechanical switches; and 3. using a single punched card. The top panel of the cabinet is a combination patching, switching and electronic module board and includes all of the computing components, toggle switches, mode control switch, power switch, voltmeters and computing module diagrams. The mode control switch enables the user to perform "reset", "hold" and "compute" operations. The voltmeters enable input and output voltages of a programmed problem to be measured simultaneously. Switches or relays enable the user to inter-connect computing components, while jacks on the board permit patching other components of a problem, previously programmed on a sheet, for which switches or relays have not been provided. Program symbols appear on covers over the computing modules identical or similar to the ones appearing on a programmed sheet.

To one side of the main computer cabinet is attached the punched card device, an ancillary part. This device may be used at the option of the programmer when solutions to many problems need to be demonstrated in rapid succession, as by a teacher of mathematics. For each problem, a previously punched card would be used by the teacher to program or interconnect most of the computing components of the simulation. Since the computing modules are recessed within the panel, there are no objectionable protrusions above the panel. Thus, the user is not confused as to which components are interconnected or to be connected when using patch cords, or to interfere with the patching operation. The designs exemplify the utmost in simplicity.

6 Claims, 36 Drawing Figures

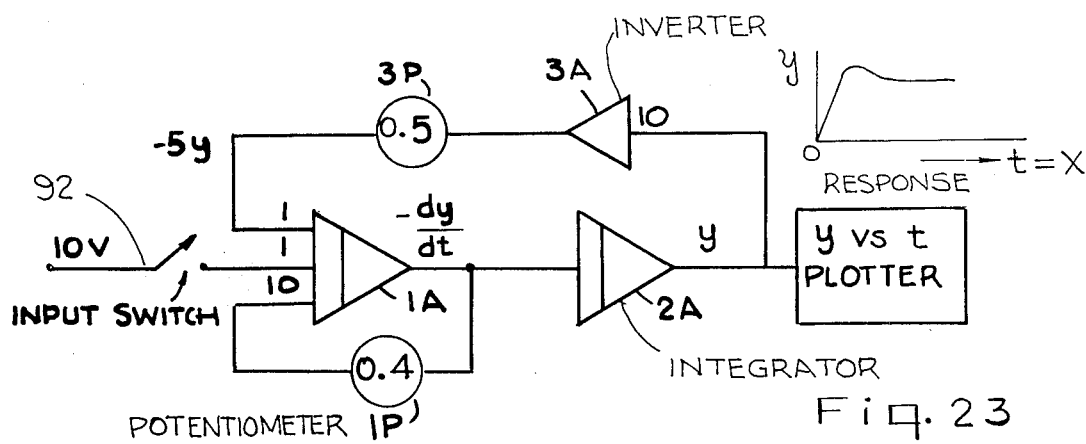
Fig. 23
EQUATION: $d^2y/dx^2 + 4\,dy/dx + 5y = 10$
| CONNECTIONS OUT TO IN | | "ON" RELAYS OR SWITCHES | |
|---|---|---|---|
| 1A | 2A | 1R | 1S |
| 2A | 3A | 2R | 2S |
| 3A | 3P | 27R | 27S |
| 3P | 1A | 11R | 11S |
| 1A | 1P | 25R | 25S |
| 1P | 1A | 15R | 15S |
| "INPUT SW" TO 1A | | PATCH | |
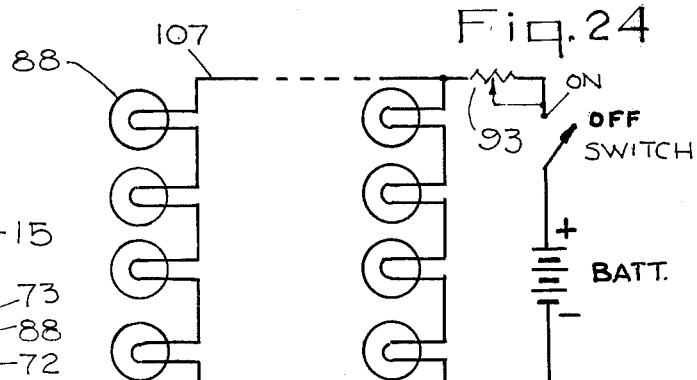
Fig. 24
9 ROWS OF LAMPS
Fig. 25
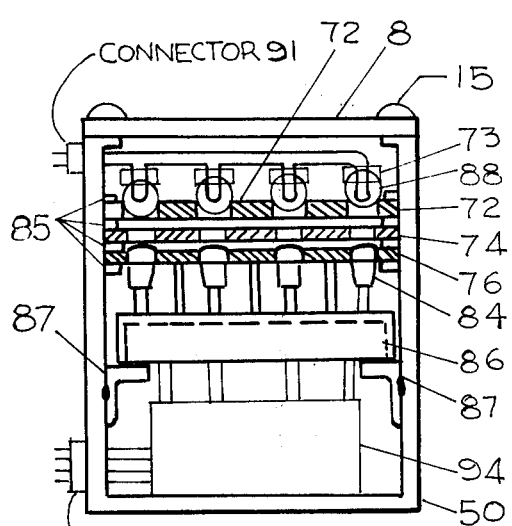
Fig. 26

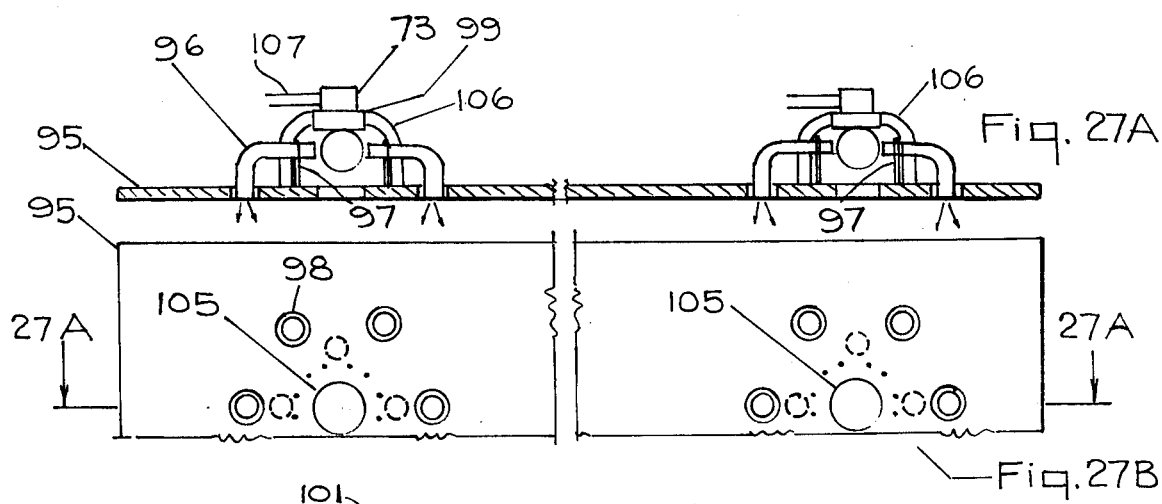
Fig. 27A
Fig. 27B
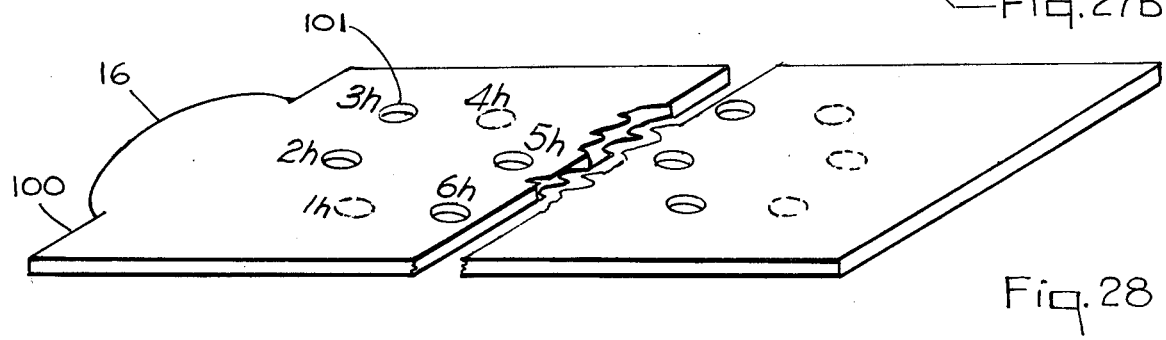
Fig. 28
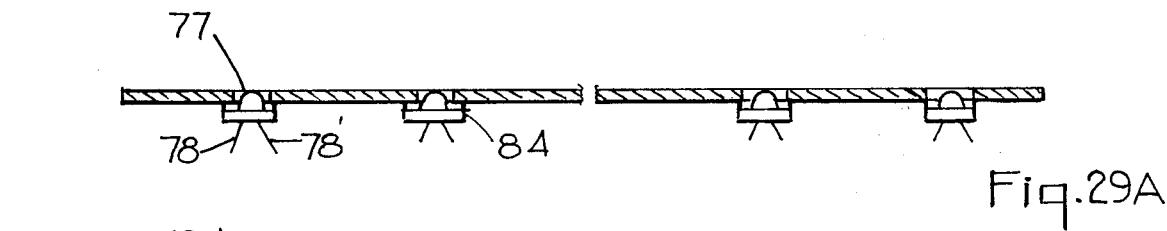
Fig. 29A
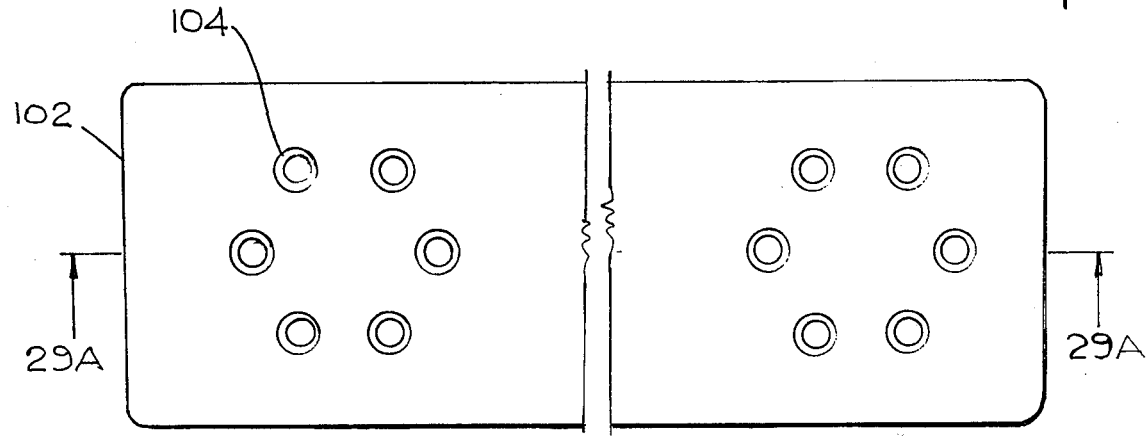
Fig. 29B
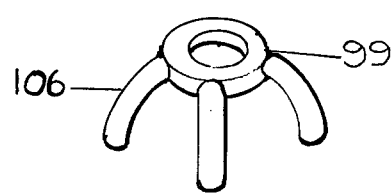
Fig. 30

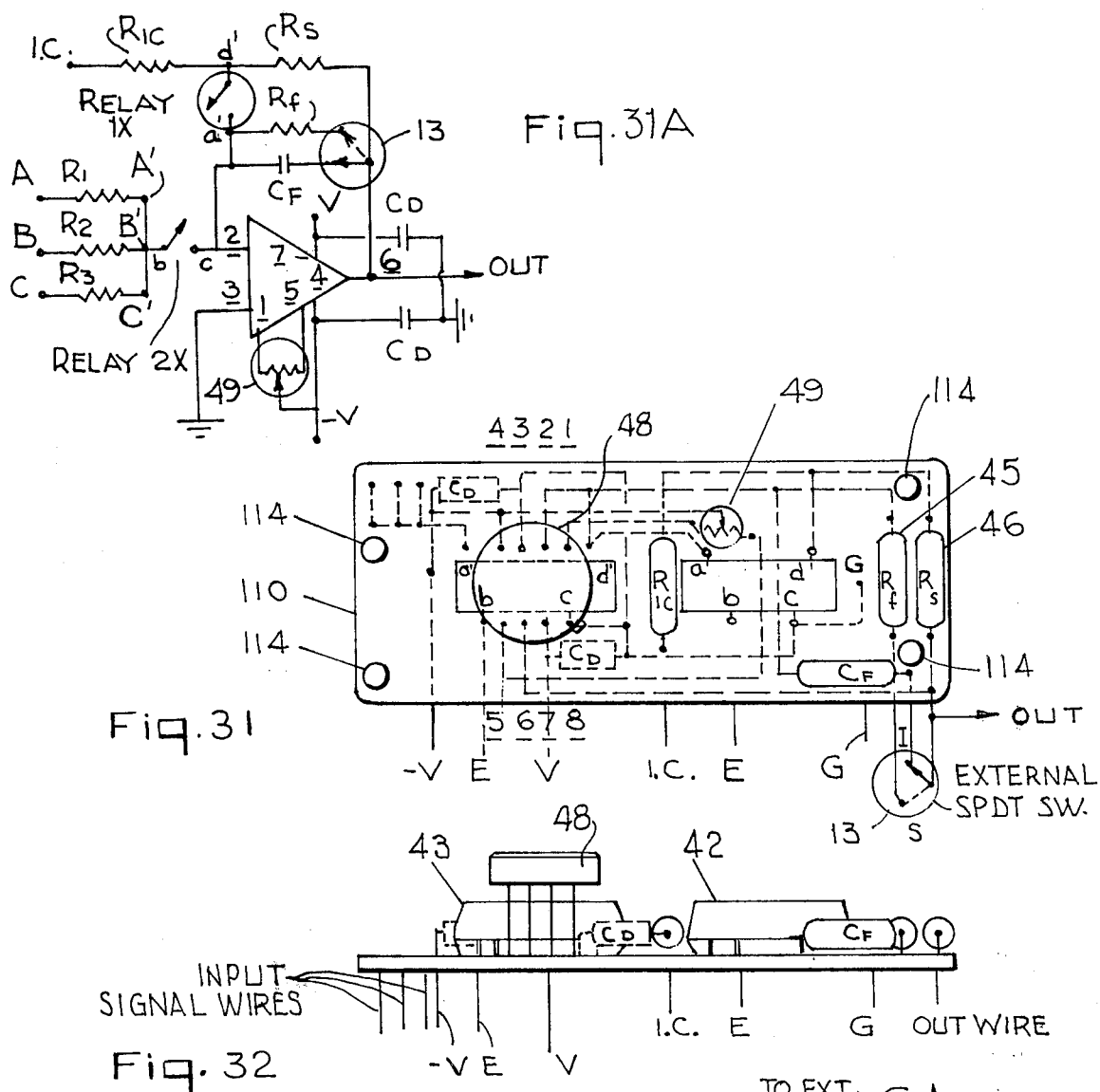
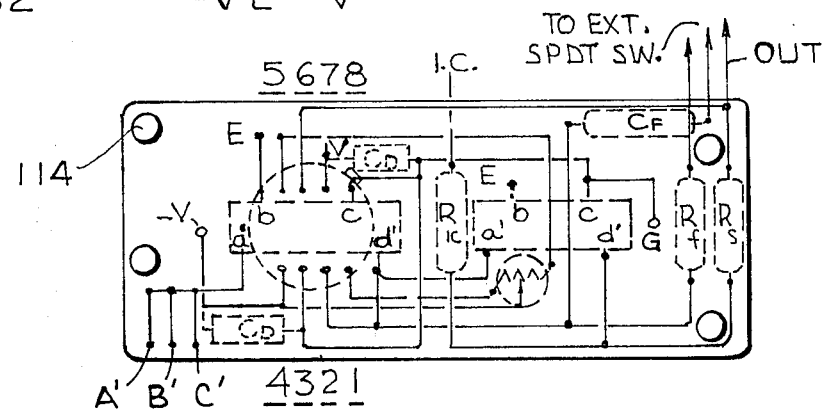
Fig. 31A
Fig. 31
Fig. 32
Fig. 33

PUNCHED-CARD PROGRAMMABLE ANALOG COMPUTER

BACKGROUND OF THE INVENTION

Other analog computers for solving problems in science, engineering and mathematics are programmed using patch cords to connect computing component, such as adders, integrators and coefficient potentiometers. This patching is time-consuming and can lead to errors if one is not careful to place the patch plug in the right jack. In addition, patch cords usually are heavy, expensive and susceptable to discontinuities through wear and abuse, leading to programming errors. If, for example, a hundred shielded patch cords were used on a patch board to program a problem, they not only would add appreciable weight to the patch board but also their large number would contribute to patching errors and to time-consuming effort to debug any errors.

On the other hand, digital computers are programmed by means of punched cards, punched or magnetic tape and directly from a typewriter keyboard. This enables one to use the same deck of punched cards to repeat solutions of a problem on a computer. Thus far punched cards have not been used as an alternate or substitute method of programming an analog computer. In the proposed computer each punched hole in a card represents or performs the function of a patched cord. Thus, to perform the function of a one hundred patch cords, one would need to punch one hundred holes in a card. Then one would insert this card in a slot, turn on the computer and all of the desired components would be connected to each other instantly. This is of great advantage to a classroom mathematics, physics or electronics teacher. For example, say it is desirable to program several problems during a classroom period in order to illustrate graphically to a class the solutions to various types of problems. The teacher would bring to class as many prepunched cards as problems to be solved in class, plus the computer, which might be book-sized or a little larger. Each time a new problem is to be solved, the teacher replaces the old card with a new one, inserts one or two patch cords to complete the needed patching of the board and turns on the computer. As in digital computers, these cards can be used over and over again at different classes. However, instead of having a deck of perhaps several hundred cards as in digital computer programming, a single card is needed to program each problem.

SUMMARY OF THE INVENTION

This improved computer puts the advantages of analaog computation right at one's desk. Differential equations, basic to most engineering problems, can be solved with surprising rapidity. Even if one has never seen an analog computer before, one can learn to operate the computer described herein almost as easily as a programmable hand calculator, such as Hewlett-Packard HP-65. In addition, this analog computer can be part of an actual control system. A hand calculator does not have this capability. Patching of a problem has always been a time-consuming unpleasant task leading to errors, even when programming a second order differential equation. Now the programmer is relieved of this drudgerous task by having the option between flipping toggle switches or using a punched card. Just a very few patch cords are required to complete the simulation of a problem, such as for introducing a signal to the system and for measuring and recording the output signals. After interconnecting computer components, the scaling of an equation is accomplished with coefficient potentiometers and by changing amplifier gains, if required. Amplifier integer gains are easily implemented by inserting the appropriate input resistor. When a gain is to be adjusted by a decimal amount between zero and one, then a coefficient potentiometer is used in the loop. The solution of problem is initiated by first turning on the power switch, which also supplies power to the punched card device, when plugged in. Then the three-way mode control switch is flipped to "reset" position to discharge the integrator capacitors. Then, the switch is moved to "compute" position, introducing the input signal to the completely implemented simulation of the problems. The solution immediately takes place and may be observed on the output voltmeter, an oscilloscope and/or an X-Y plotter, when each of these instruments are connected to the simulated system's output signal via patch cords. If a solution needs to be stopped for examination, the center "hold" switch position is used. It is easy to repeat the "compute" cycle using the suggested rocker switch.

BRIEF DESCRIPTION OF THE DRAWINGS

For the purpose of illustrating the invention, there are shown in the drawings forms there of which are presently preferred. It is to be understood, however, that this invention is not necessarily limited to the precise arrangement, instrumentalities and field of utility as therein demonstrated.

FIG. 23 is an analog computer program of a second order differential equation, including a damping term. Diagrams of amplifier and integrators agree with diagrams on cover, FIG. 4.

FIG. 24 shows a table of connections to be made and the relays or switches that should be turned on to make the desired connections between computing components.

FIG. 25 shows the wiring connections for the lamps. Switch shown represents a single pole 3PST switch 19 in FIG. 10.

FIG. 26 is a sectional view of the punched card reading device taken along lines 26—26 of FIG. 1.

FIG. 27A illustrates a sectional view of the lamp board taken along lines 27A—27A of FIG. 27B showing a single lamp supplying illumination to several holes via fiber optic bundles. The center portion is broken away in the interest of simplicity.

FIG. 27B illustrates a plan view of the lamp board, showing location of holes for each lamp location.

FIG. 28 illustrates a perspective view of the punched card showing the holes in circular configurations. Dashed circles indicate missing holes in th configuration and mean that those relays will not be activated. The center portion is broken away in the interest of simplicity.

FIG. 29A illustrates a partial sectional view of the photo transistor board taken along lines 29A—29A of FIG. 29B.

FIG. 29B illustrates a plan view of the photo transistor board, showing the same circular configuration of holes as the maximum number on the punched card of FIG. 28 photo transistors are attached to these holes.

FIG. 30 shows a device useable in FIG. 27A.

FIG. 31 shows a plan view of a printed circuit card with the components for an integrator circuit attached.

FIG. 31A shows a circuit of a combination integrator and summer.

FIG. 32 shows a side view of the printed circuit card with components attached and leads to exterior components extending.

FIG. 33 illustrates a plan view of the underside of printed circuit card showing copper foil conducting strips connecting components.

DESCRIPTION OF PREFERRED EMBODIMENTS

Figure 1:
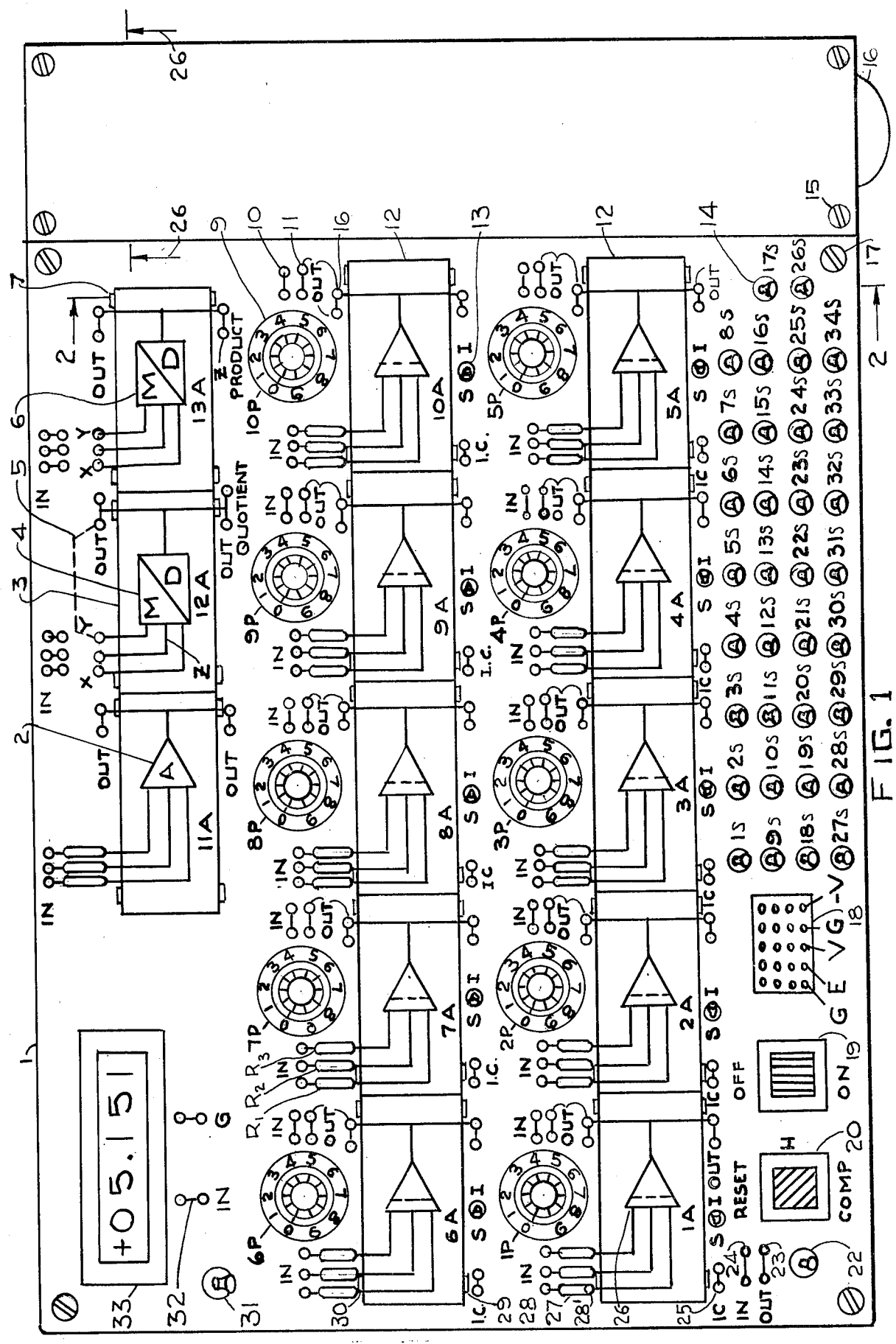
FIG. 1 shows a top view of the versatile analog computer, including the attached punched card device.

Referring to the accompanying drawings, FIG. 1 illustrates a typical plan view of a versatile lightweight analog or hybrid computer about the size of a large book. Panel 1 is a combination patch and electronic module board. Shown are symbolic diagrams of one summing amplifier 2, ten combination summing amplifiers and integrators 26 and two multiplier/dividers 4 and 6. Beneath each symbolic diagram are a pair of terminal strips similar to FIG. 6, ten 10-turn potentiometers and dials 9, thirty-four toggle switches 14 for making connections between computing components and an ON/OFF power switch 9 and a mode control switch 20. Also is a terminal block 8 with supply voltages available for external application to amplifiers and other components via potentiometers.

Figure 4:
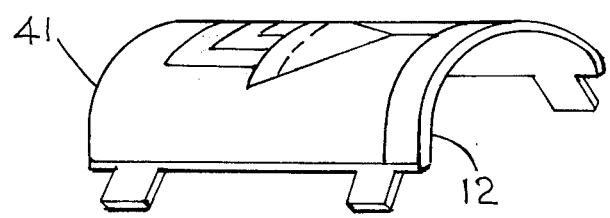
FIG. 4 is a perspective view of one of the plastic covers, including a removable block diagram of the circuit underneath the cover.
Figure 13:
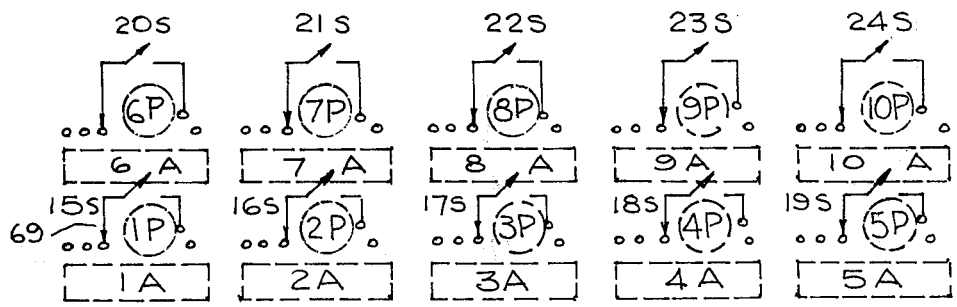
FIG. 13 shows switch positions and wiring for making feedback connections between the output of a potentiometer and the input of an amplifier of the same number. Ten such connections are shown for the first ten amplifiers.
Figure 14:
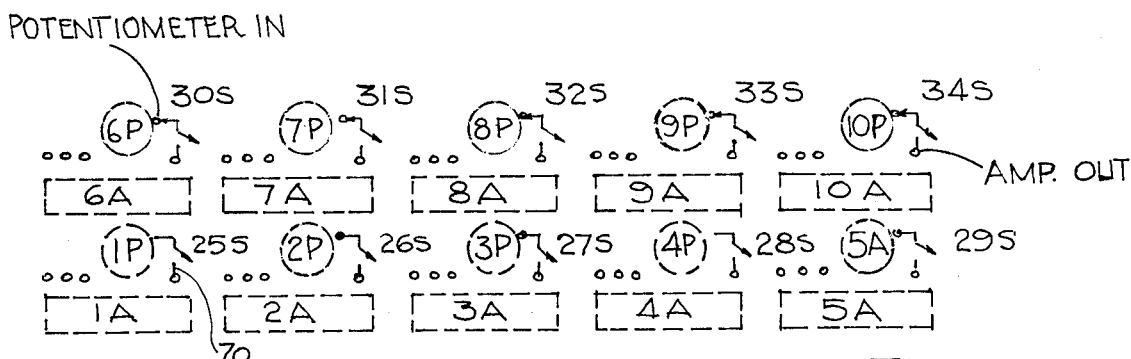
FIG. 14 shows switches and wiring for making a connection between the output of an amplifier and the input of a potentiometer of the same number.
Figure 18:
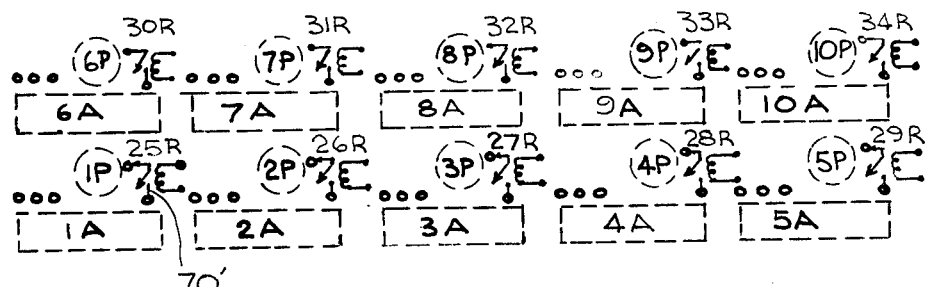
FIG. 18 illustrates relay positions and wiring for making a connection between the output of an amplifier and the input of an adjacent potentiometer of the same number.

Switches 22 and 31 enable step voltages to be introduced, as desired, to computing components or to perform other manual switching operations. Small circles 10, 11, 23, 24, 25, 28, 32, indicate jacks for interconnecting components with patch cords. Switches 22 and 31 enable step voltages to be introduced, as desired, to computing components or to perform other manual switching operations. Terminal block 18 has supply voltages available for external application to amplifiers and other components via switches 22 and 31 and potentiometers and 10-turn dials 9. Switch 9 is a triple three-pole, single throw (3PST) for applying the required supply voltages to amplifiers, multiplier, relays and logic computing components, if any, and lamps in punched card device 8 on panel 1. Switch 20 is a green-colored momentary "on"-off-momentary on, single pole, double throw illuminated rocker switch. This switch applies excitation voltage to the "reset" and "operate" relays if integrators, in accordance with FIG. 13 U.S. Pat. No. 3,996,457 dated 12-7-76. Switch 19 may be a red-colored illuminated rocker switch. It lights up when in the "on" position. Voltmeter 33 is for measuring the input and output voltages of amplifiers. Although a digital voltmeter is shown it may be replaced by one or two center-scale analog voltmeters, capable of accepting the desired magnitude of voltages in the same space occupied by the digital voltmeter. Cover 3 extends the entire length of three computing components, although three separate covers may be used, one for each computing component and contains program block diagrams of the circuits beneath. Connection 5 is to convert multiplier 3 into a divider. Numerals 10 and 11 refer to the input and output jacks of a 10-turn potentiometer whose 10-turn dial 9 is shown. Switch 13 is for converting the computing component, to which it is adjacent, from an integrator "I" into a summing amplifier "S", and vice versa. There is one toggle switch shown adjacent to each computing component. Jacks 23 and 24 enable introducing output and input signals respectively for switch 22. Jack 25 enable introducing initial conditions to its adjacent computing component, when used as an integrator. Numeral 27 refers to a plug-in input resistor. Although three input resistors are shown for each computing module, four or five can be used, if desired, to enable a greater variety of amplifier gains and introduction of more input signals. Thirty-three such input resistors are shown in FIG. 1. Jack 28 enables one to introduce a signal to input resistor 27. This jack's body, extending below panel 1, is connected to a switch and a relay, as shown in FIG. 14 and FIG. 18, as a substitute for patching. Cover 12 has downward depending projection along its bottom edges, as shown in FIG. 4, for insertion into slots 29 and 30 formed in panel 1. The cover is resilient and may be manually compressed so that projections may be inserted into slots for firm resilient retention of the cover panel 1. Screws 17 hold panel 1 onto cabinet 36, shown in FIGS. 2 and 5. Screws 15 hold cover 8 onto cabinet 50. Cover 12 may extend the entire length of the computer, instead of being four individual covers, one for each computing component. The 34 switches shown may be replaced by terminal strips for experimental circuitry or for digital integrator circuits for hybrid computer applications.

Figure 2:
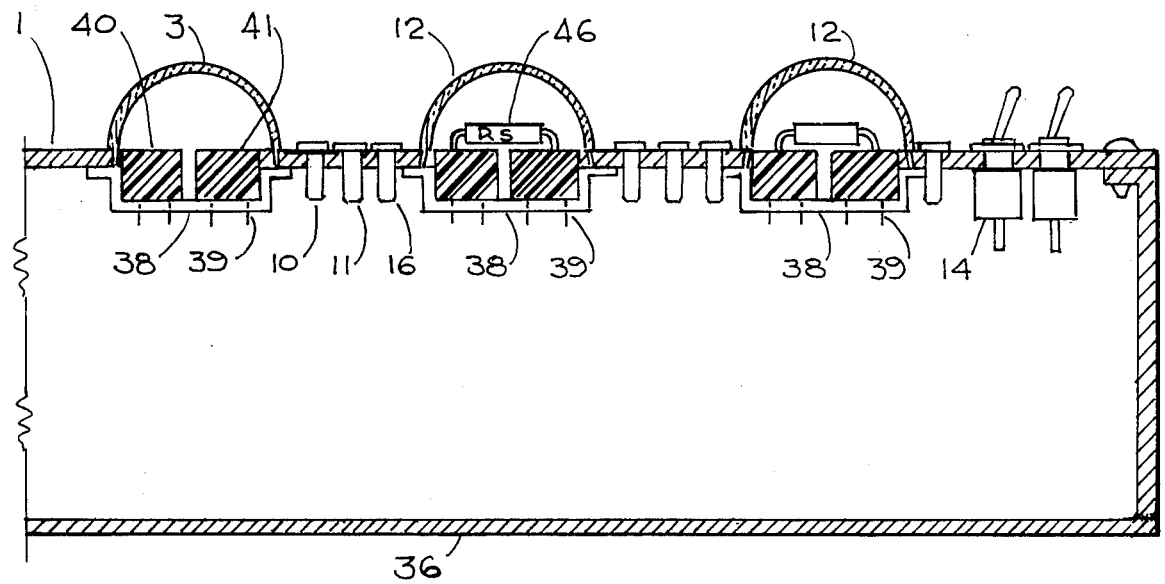
FIG. 2 is a partial sectional elevation view of the analog computer showing the terminal strip support structure taken along lines 2—2 of FIG. 1.

FIG. 2 shows a section across the computer along lines 2—2. Note that terminal strips 37 and 37' are recessed so that their tops are flush with panel 1's surface. Covers 3 and 12 are semi-circular in shape, for easier patching, should patch cords be used. Brackets 38 help support terminal strips 37 and are spaced and positioned so as to avoid interferring with jacks 11' and wires which may extend between terminal strips 40 and 41.

Figure 3:
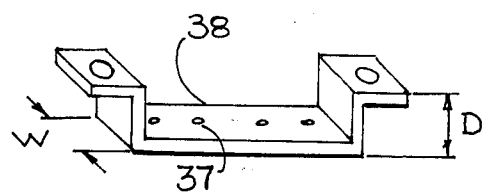
FIG. 3 is a perspective view of one of the brackets which support a pair of terminal strips.

FIG. 3 is an isometric view of bracket 38 made of nonconducting material. Its width W may be ¼ inches or greater and its thickness 1/16inch or greater. Two are suggested for each pair of terminal strips. Pins 39 extend under terminal strips 40 and 41 and into bracket 38, at hole positions 37. Shunt resistor 46 is shown straddling the terminal strips. The construction of the terminal strip is shown in patent application Ser. No. 3,996,457 dated 12-7-76. A cover for one computing module is shown in FIG. 4. The material may be 1/32 inch thick plexglass or rigid vinyl. The programming symbol of the circuit it represents is drawn on an etched or frosty film and then placed over and adhered to the rigid vinyl by means of an adhesive.

Figure 5:
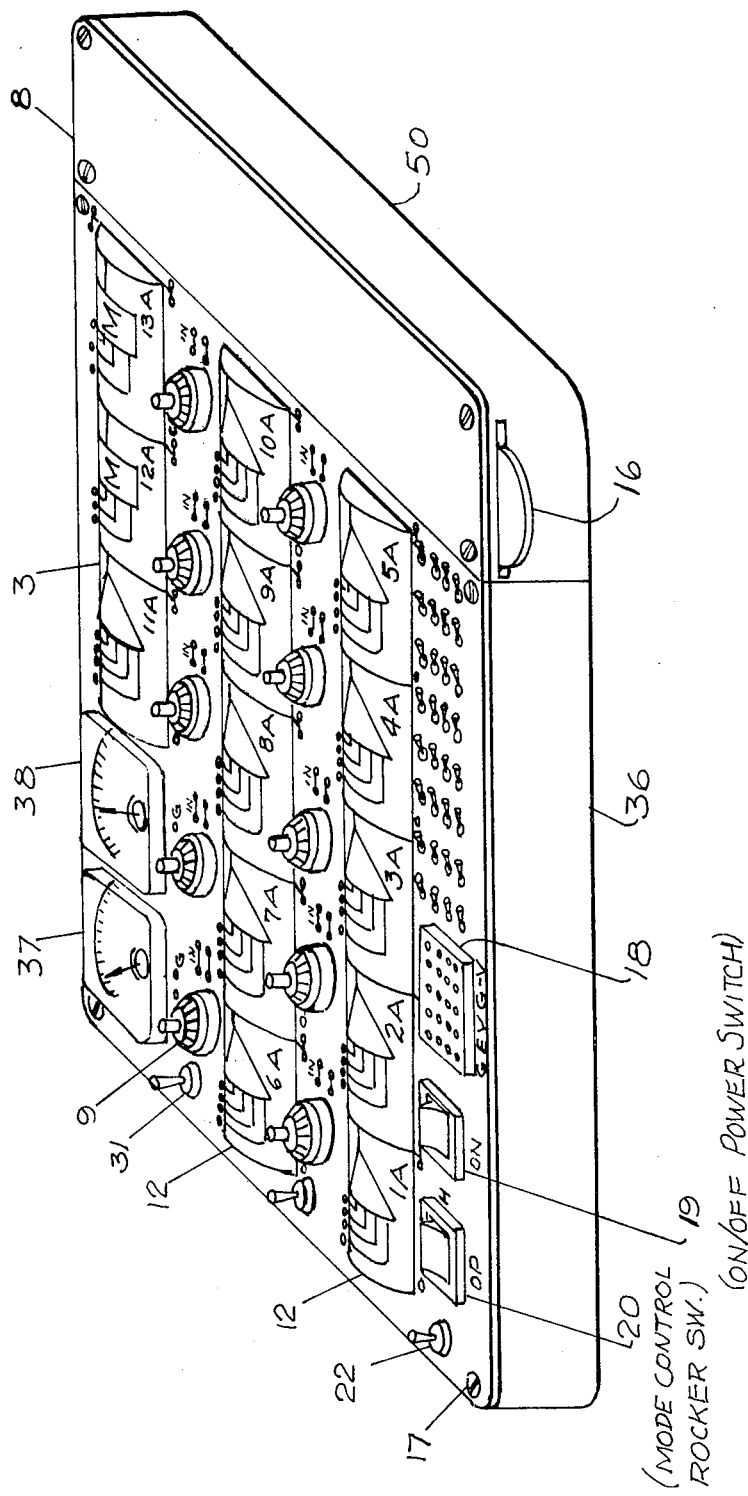
FIG. 5 shows a perspective view of the computer, including a elongated plug-in part containing the punched card reader.

FIG. 5 is a three-dimensional view of the analog computer showing panel 1, voltmeters 37 and 38, diagrammed covers 3 and 12, potentiometer 10-turn dials 9, toggle switches 22 and 31, three pole rocker switch 20 and on/off rocker switch 19, switches 14 for interconnecting components. Panel 1 is held onto cabinet 36 by four screws 17. Punched card device 8 enables a punched card to close selected relays for interconnecting computing components. Device 8 is plugged into the side of cabinet 36 via electrical connectors, the male portion being attached to the side of device 8. Within cabinet 36 are the power supplies and/or batteries for applying the desired voltages to the operational amplifiers, multipliers and relays. A four-wire flexible strip between switch 19 and power supply terminals is sufficiently long to permit removal of the panel and maintain or replacement of parts. Although analog voltmeters are shown, they may be replaced by a single digital multi-range voltmeter, as shown in FIG. 1, capable of accepting analog signals. Cover 12 can extend the entire length of the panel and contains program block diagrams of the computing circuits beneath.

Figure 6:
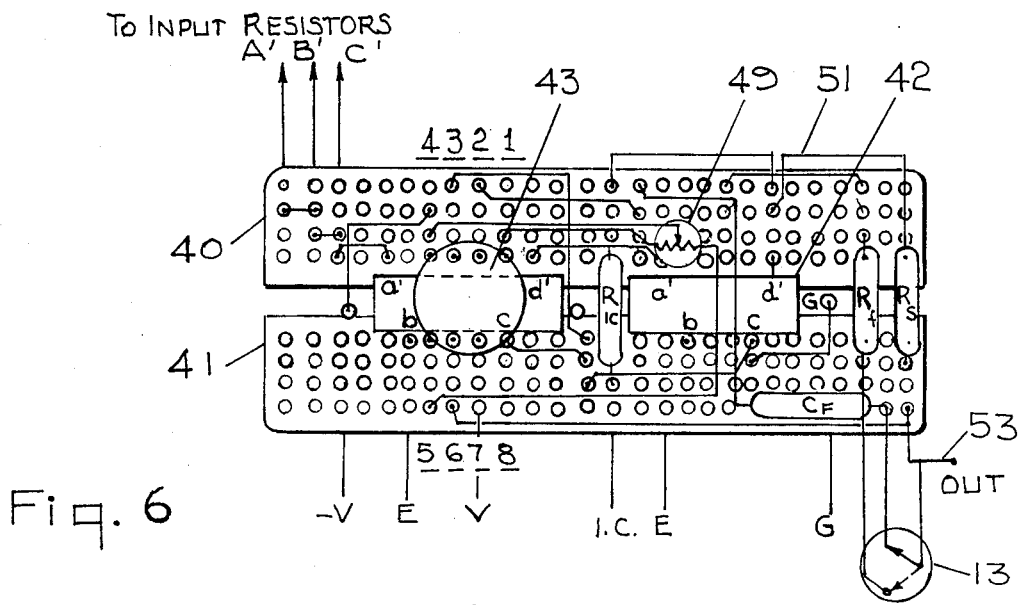
FIG. 6 shows the mechanical arrangement of components on a pair of terminal strips.

FIG. 6 is a plan view approximately double size of a pair of terminal strips 40 and 41. These two need not be attached together as shown in Ser. No. 525,511 filed 11-20-74 as brackets 38, FIG. 3, hold them in position via pins 39. Dual-in-line package relays 1 and 2, identified by numbers 42 and 43, respectively, enable performing the reset and operate modes of the integrator circuit shown in FIG. 8. The assembly contains the components of a summing integrator circuit, excluding input resistors 27 shown in FIG. 1, but including initial condition input resistor 44, feedback resistor 45, shunt resistor 46, feedback capacitor 47, FET — input operational amplifier 48 and trimmer potentiometer 49. These components are interconnected by wires, such by as wire 51, and with the aid of metal terminal clips, shown in U.S. Pat. No. 3,996,457. The circuit input wires 52 are inserted into solderless clip points under terminal strip 40 at one end, and soldered or wire-wrapped to jacks 28', FIG. 1, at the other end. Similar connections apply to the integrator circuit output wire 53. Wire 53 has one end inserted under terminal strip 41 and the other end soldered or wire-wrapped to the underside of an output jack, such as jack 11'.

Figure 7:
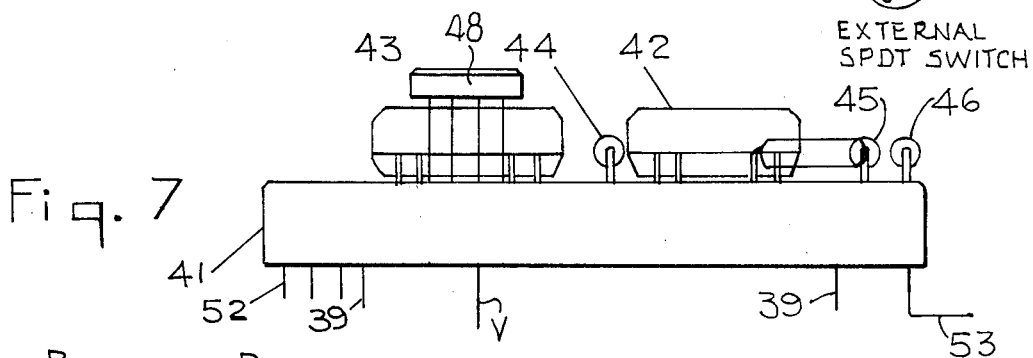
FIG. 7 shows a side view of the terminal strips and components of FIG. 8.
Figure 8:
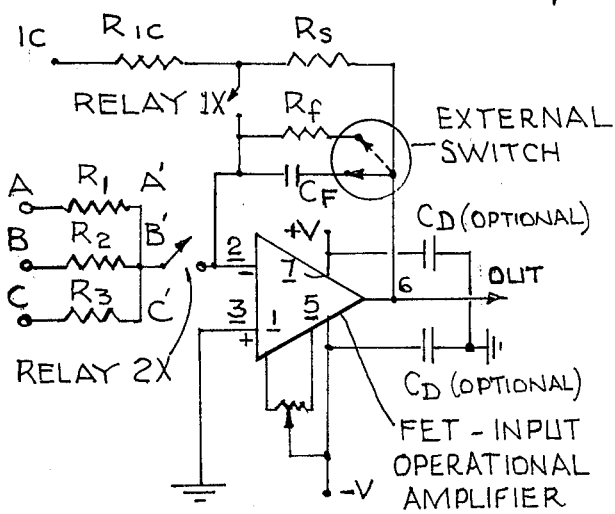
FIG. 8 shows a circuit of an integrator which is capable of being converted into a summing amplifier.
Figure 9:
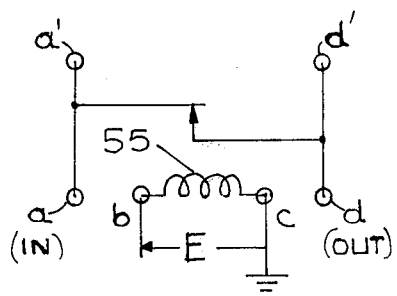
FIG. 9 shows a schematic diagram of a reed relay.

FIG. 7 is a side view of FIG. 6 and shows OP AMP 48 inserted to the top of terminal strips 40 and 41. There would be no interference with relay 2 identified by numeral 43 if OP AMP 48 leads are sufficiently long. Note, that wires 52 and 53 enter terminal strips 40 and 41 from underneath. This is desirable in order that these wires not interfere with covers 3 and 12. FIG. 8 is the schematic diagram of the mechanical layout of FIG. 6. Optional bypassing capacitors $C_d$ are not shown in FIG. 6. Unbypassed long supply leads can cause oscillation problems. Oscillations may occur at higher frequencies. If so, these capacitors should be low-inductance, ceramic-disc type about $0.01\mu f$ in value. Resistors R1, R2 and R3 are external to the terminal strips and are shown in FIG. 1. Relay coils 55 shown in FIG. 9 are not included in FIG. 8 to avoid the confusion of showing too much in one schematic. Relay shown in FIG. 9 is a subminiature integrated-circuit compatible-package reed relay as manufactured by North American Philips Controls Corp., Frederick, Md.

Figure 10:
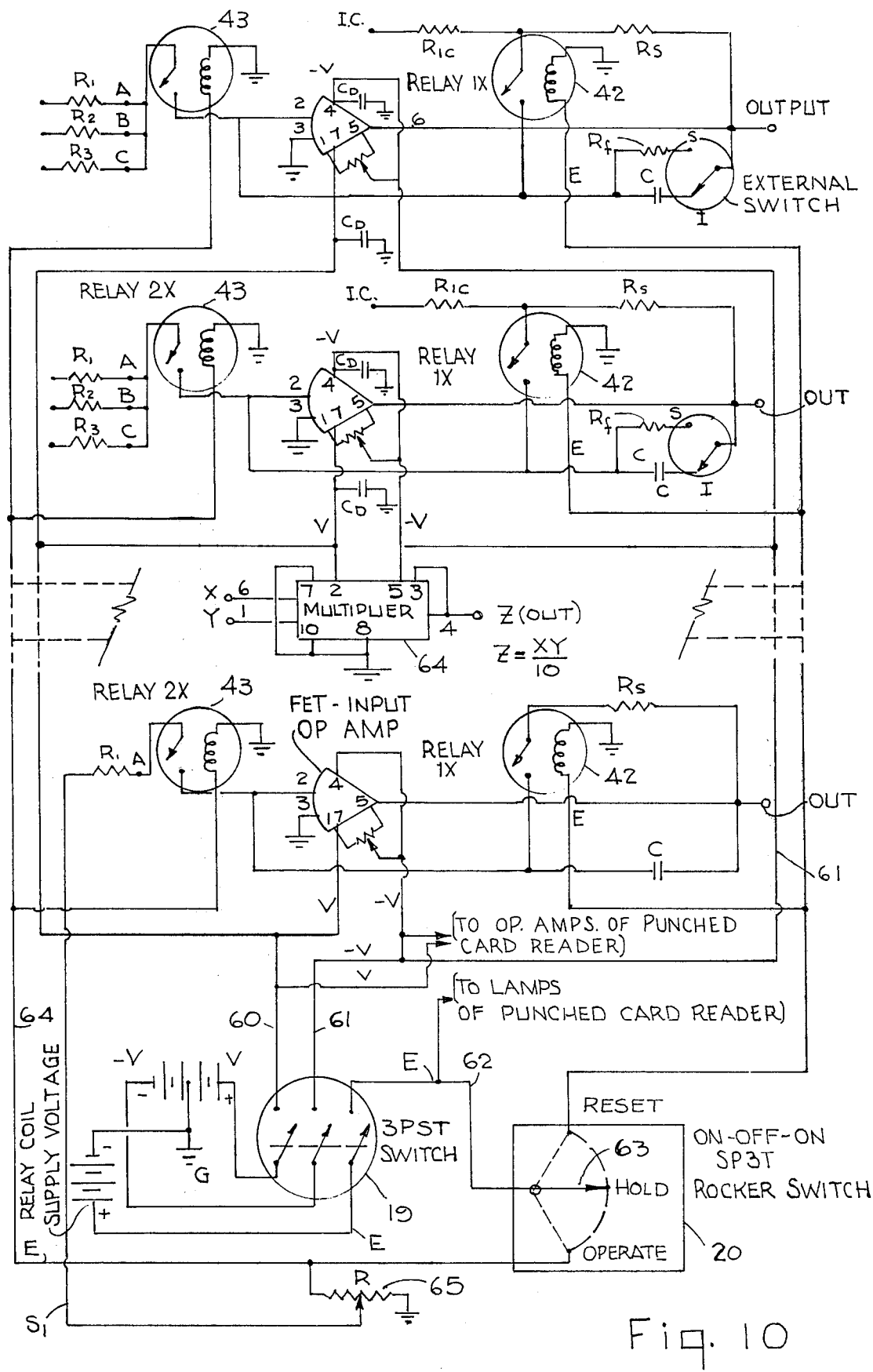
FIG. 10 is a circuit diagram of the power supply wiring from two supplies to typical integrator operational amplifiers, a typical integrated circuit multiplier, power switch and three-way mode control rocker switch.

FIG. 10 shows wiring from control switches 19 and 20 to typical integrators and multipliers indicated diagrammatically in FIG. 1. Wire 60 supplies $+v$, wire 61 supplies $-v$, wire 62 supplies E voltage to reset relays 42 when arm 63 of rocker switch 20 is at reset, wire 64 supplies E voltage to operate relays 43 when arm 63 is at operate position. One integrator circuit, such as the one shown close to the rocker switches, may be used for providing a recording instrument or an oscilloscope with a signal for its horizontal time axis. The rate of integration of the signal $S_1$ is controlled by setting of potentiometer 65. I.C. multiplier 64 is model AD532 manufactured by Analog Devices Inc., Mass.

Figure 11:
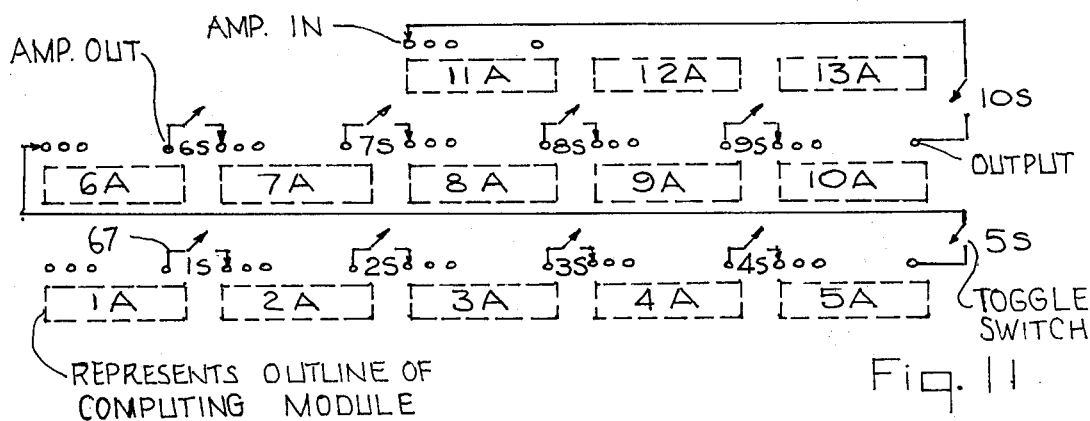
FIG. 11 shows an alternate approach to implementing a program on the computer, namely the use of switches to interconnect adjacent computing modules. A switch is shown for completing the path between an output of one amplifier and the input of an adjacent amplifier.
Figure 12:
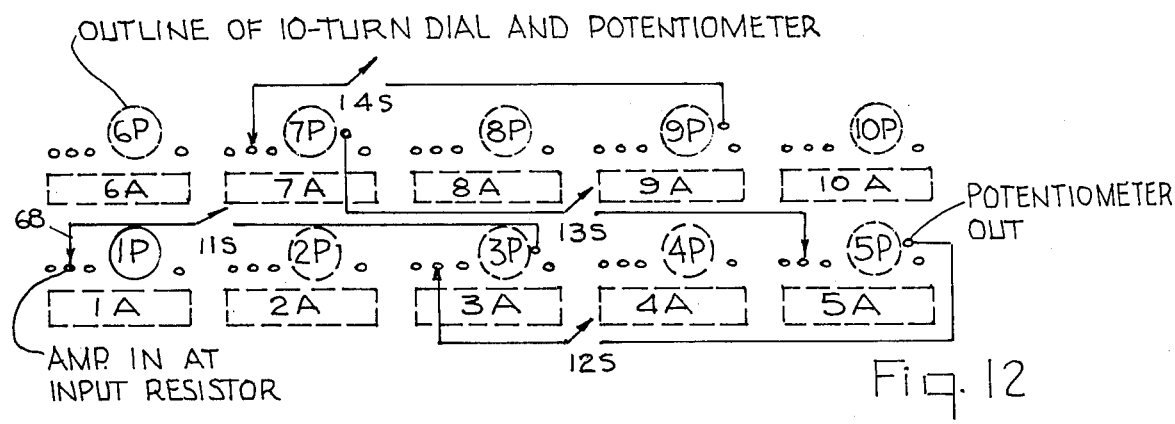
FIG. 12 shows switches and wiring for making feedback connections between an odd potentiometer output and an odd amplifier two amplifiers upstream.

Connections between computing components may be performed in several ways, — by patch cords, by switches, and by relays activated by punched holes. FIGS. 11 to 14 show switching circuits which can make connections between components. Components are shown in dashed lines — only the S PST toggle switches would be exposed as shown at a central area in FIG. 1. Wiring between jack bodies is done underneath panel 1, FIG. 1. Numbers in FIG. 1 correspond to numbers in FIGS. 11 to 14. FIG. 11 shows switches and connections between adjacent amplifiers. A total of ten is indicated. Typical path between amplifiers 1A and 2A is identified by numeral 67. FIG. 12 shows switches and connections between odd components, — a connection between the output of an odd potentiometer and the input of an odd amplifier two amplifiers upstream, such as from Pot 3P to amplifier 1A identified by numerical 68. The actual total feedback loop or path would be from amplifier 3A out to amplifier 1A input with potentiometer 3P in between. The wiring is between jack bodies underneath panel 1; and when the switch is in the off position, a patch cord plug may be used in either or both of the two jacks. A total of four switches are indicated. A short patch cord from amplifier 3A output to potentiometer 3P input may be used or the switching arrangement of FIG. 14. If potentiometer 3P is not required in the feedback loop, it may be set to one, and the switch or switches can still be used. For simulating a lag network, feedback from a potentiometer to the input of its adjacent amplifier is often required, such as path 69, FIG. 13, connecting potentiometer 1P output to amplifier 1A input. Again one may use a short patch cord from amplifier 1A output to potentiometer 1P input or the switching arrangement of FIG. 14 may be utilized. The positions of the first ten amplifiers and ten potentiometers are shown in dashed lines to correspond with those shown in FIG. 1. As mentioned before, a means for connecting an amplfier output to its adjacent potentiometer is shown in FIG. 14. A typical path from amplifier 1A to pot. 1P is identified by numeral 70 and toggle switch 25S is located in this path, although physically the switch may be placed elsewhere on panel 1, FIG. 1.

Figure 15:
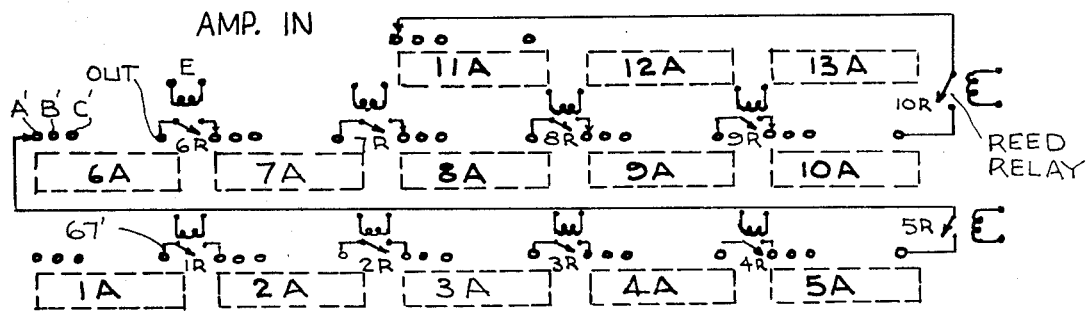
FIG. 15 shows reed relays and wiring between an output of an amplifier and the input of an adjacent amplifier. There are ten such circuits shown.
Figure 16:
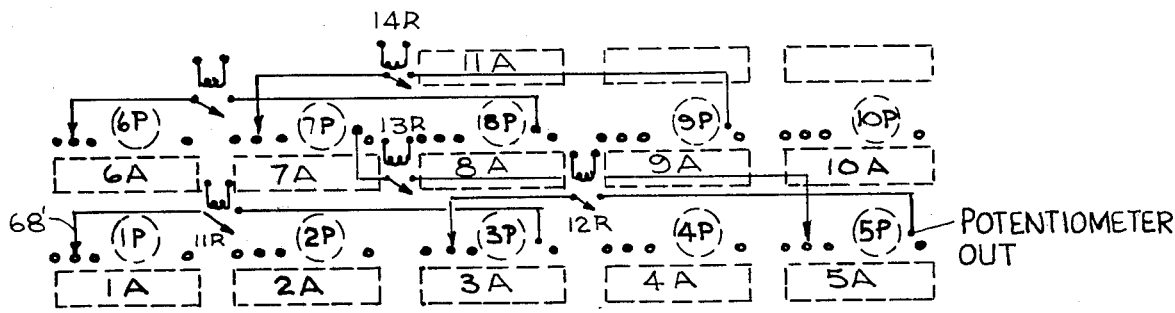
FIG. 16 illustrates relay positions and wiring for making feedback connections between an odd potentiometer output and an odd amplifier two amplifiers backward or behind.
Figure 17:
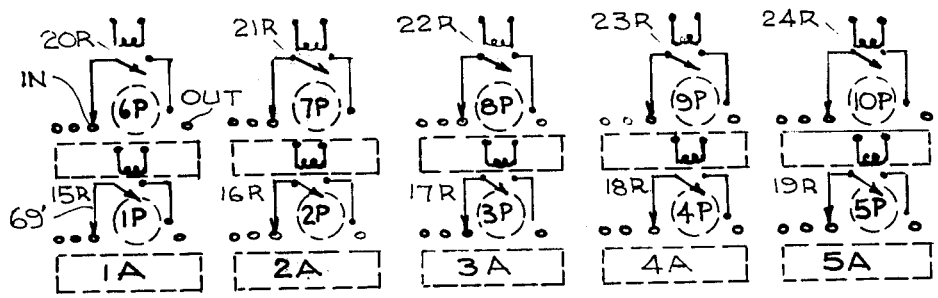
FIG. 17 illustrates relay positions and wiring for making feedback connections between the output of a potentiometer output and an amplifier of the same number.

FIGS, 15, 16, 17 and 18 show similar connections between selected computing components, as shown in FIGS. 11, 12, 13 and 14, respectively. Now instead of a toggle switch, the elements enabling an electrical connection between computing components is a reed relay, such as one manufactured by North American Philips Controls Corp., Frederick, Md. The path between amplifiers 1A and 2A, FIG. 15, is identified by numeral 67' with relay 1R located in the path. As in comparable FIG. 11, there are ten such paths and relays in FIG. 15. Selected relays are activated by holes in punched card 16 of a punched card device 50 attached to computer cabinet 36, FIG. 5. In FIG. 16, instead of a toggle switch completing path 68' between output of Pot. 3P and input of amplifier 1A, reed relay 11R is used to complete this connection. There are four such relays and these, too, may be activated by holes punched in a card and inserted in punched card device 50. In FIG. 17, instead of a toggle switch completing path 69' between output of pot. 1P and input of amplifier 1A, reed relay 15R is used to complete this connection. There are ten such paths and relays. In FIG. 18, instead of a toggle switch completing path 70' between output of amplifier 1A and input of pot. 1P, reed relay 25R is used to complete this connection. There are ten such paths and relays, as shown in FIG. 18.

Figure 19:
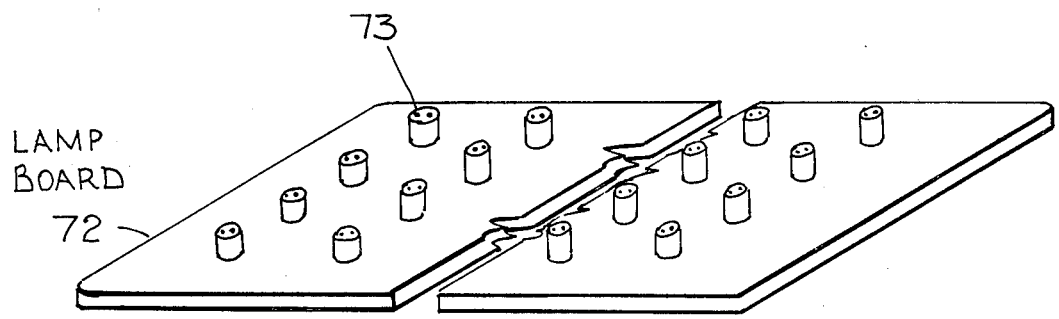
FIG. 19 shows a perspective view of the top lamp board of the punched card reading device. The center portion is broken away and omitted in the interest of simplicity and clarity.
Figure 20:
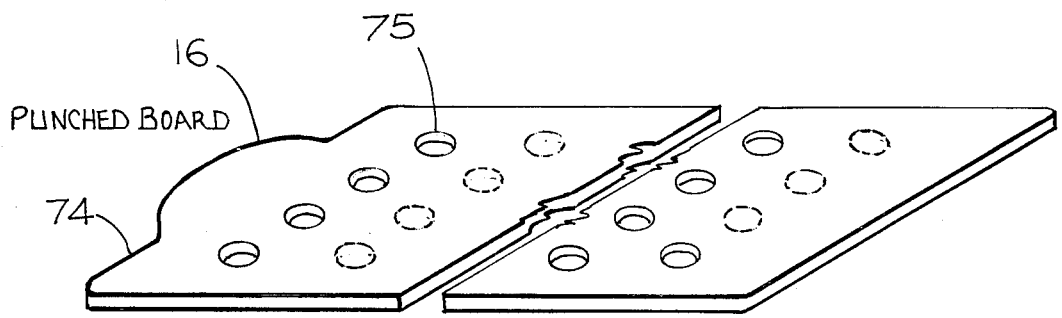
FIG. 20 shows an isometric view of the punched card or board. The center portion is broken away in the interest of simplicity and clarity.
Figure 21:
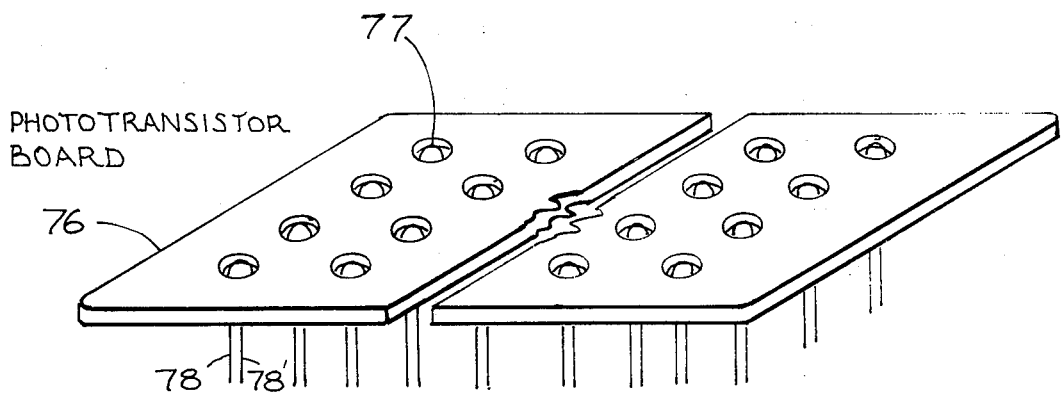
FIG. 21 shows an isometric view of the photo transistor board.
Figure 22:
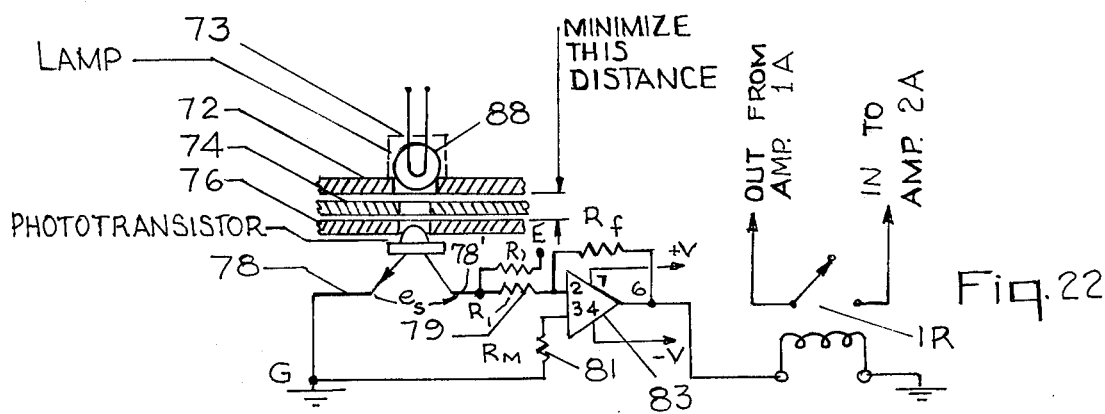
FIG. 22 shows a sectional view of the relative position of the boards shown in FIGS. 19, 20 and 21, including the amplifier and relay circuitry.

An alternate method of making connections between the computing components has been mentioned above as being accomplished through activation of relays by remote means. The remote means is through a punched card device 50 attached to cabinet 36, FIG. 5. Within the device 50 are three cards or boards in close proximity to one another along their flat surfaces, and supported by flat strips 85 along their longitudinal edges, FIG. 26. FIG. 19 shows the lamp board with holes located in straight rows of four to a row. Nine rows would provide holes for 36 lamps. Lamps 82, FIG. 22, protrude slightly through the holes and are held in place by sockets 73 which are attached to the lamp board by cement. Beneath the lamp board is the punched card or board 74 with protrusion 16 and with holes located in identical positions to correspond with those in lamp board 72 shown in FIG. 20. Only those holes 75 are punched which correspond to relays that need to be closed to program a prepared problem. Other hole locations remain opaque to light from the lamps of board 72. The holes 75 may be punched or drilled depending on the board's thickness. For a thin board or card the dashed circular lines may be a perforation performed by a printing die to enable removal of the circular area with a dull pointed object. Board 74 in FIG. 20 has a projected lip 16 to enable its easy removal and replacement. Beneath board 74 is phot transistor board 76 with holes located in identical positions to correspond with those in lamp board 72, shown in FIG. 21. Board 76 has as many holes as board 72. A photo transistor 77 is attached to each hoee with its light sensitive surface exposed on top to receive light from its corresponding lamp in board 72. The top of the photo transistor is held so that it is flush with the top surface of board 76. Phototransistor may be held in place by a socket 84, FIG. 26, which is cemented to the undersurface of board 76. Board 76 may be of laminated plastic construction. FIG. 22 shows a sectional view of the three boards similar to a portion of FIG. 26, as well as the circuitry for amplifying the photo transistor signal and applying it to a typical relay IR. The signal $e_s$ is applied to operational amplifier 83 whose gain is related to the ratio Rf/R1. The preferred value of Rm equals $$\frac{R1\ Rf}{R_1 + R_f}.$$

The signal amplified in voltage and current is applied to coil of relay 1R, enabling relay switch to close, completing the circuit between the output of Amp. 1A and input of Amp. 2A, as a typical example.

A typical second order equation, $dy^2/_{dx^2} + 4dy/_{dx} + 5y = 0$, is shown programmed in FIG. 23. The purpose of this example is to indicate to the user his options in implementing the connections between components. The options are: patching with patch cords, manually, flipping a mechanical switch and/or inserting a punch card with selected holes. By examination of FIG. 23, one can construct table shown in FIG. 24. In FIG. 23 the 10 volt applied to integrator 1A via input switch must be patched with a patch cord, but all other connections can be made either by a toggle switch or by a relay, as indicated in table of FIG. 24. FIG. 25 shows a suggested series - parallel arrangement for connecting lamps 88. If the voltage applied to the four lamps connected in series exceeds the voltage ratings of the lamps, then rheostat 93 can reduce the applied voltage to the lamps. The battery shown could be the same one supplying voltage E, shown in FIG. 10. There are as many lamps as the largest possible number of holes in punched card 74.

FIG. 26 is a section taken along lines 26—26 of FIG. 1. The three paralled — positioned boards 72, 74 and 76 are shown inside cabinet 50 of punched card device. Within the cabinet is board 72, with lamps, positioned between supports 85 along its longitudinal edges. Below board 72 is punched card 74, also supported by strips 85. Below card 74 is photo transistor board 76 held in place dby strips 85. Below board 76 is photo transistor circuit chassis 86 supported on brackets 87. There are as many circuits as photo transistors or a total of 34 circuits. Below the circuits of chassis 86 are the relays in chassis 94 for closing electrical connections between selected computing components. These are mounted either on terminal strips or on printed circuit cards. The wires for supplying power to the operational amplifiers 83 and the wires for interconneting components, such as amplifiers and potentiometers, are soldered to connector 89 with as many terminals as wires at the side of cabinet 50. The two wires for supplying power to lamps 88 are soldered to connector 91 also mounted on the side of cabinet 50, as shown. Since the assembly and arrangement of the photo transistor circuits on chassis 86 and the assembly of relays on terminal strips on chassis 94 are conventional, they have not been shown.

The female receptacles for male connectors 89 and 91 are mounted on the side of cabinet 36 and positioned to coincide and mate with the male connectors of device 50. Connectors and sockets of the desired size may be obtained from electrical connector manufacturers, such as TRW/Cinch Division, Elk Grove Village, Illinois.

A scheme for reducing the number of lamps required for the punched card device by a factor of six or more is illustrated in FIGS. 27A, 27B, 28, 29A and 29B. In FIG. 27A is shown a cross section of the lamp board along lines 27A—27A. Lamp 88 and socket 73 are supported by structure 99. Voltage E supplies current to lamps 88 via wires 107. Fiber optic bundles 96 are supported and maintained in position by stiff wires 97 or rigid plastic pieces, not shown. Light from lamp 88 enters fiber optic bundle 96 and follows curved path of bundle to perpendicular direction to board 95. Although six bundles are indicated per lamp, more bundles of fiber optics may be positioned in a circular configuration. Although a circular configuration is shown, the bundles may be positioned in a square-shaped configuration. Holes 105 enable lamps to be removed. Holes 98 are for insertion of fiber bundle ends. FIG. 27B is a partial plan view of the lamp board. FIG. 28 shows a partial perspective view of punched card 100 having numerically identified holes 101 to correspond in position with the location of the ends of fiber optic bundles 96. A lip 16 extending from card 100 enables the user to remove card and replace it by another. There are as many hole positions as fiber optic ends; in this case, there are a total of thirty-six. If the entire card were shown, there would be six circular configurations with six holes in each.

FIG. 29A represents a partial sectional view of photo transistor board 102 along lines 29A—29A. Phototransistor is held in place by socket 84 cemented to the underneath of board 102. Wires 78 and 78' extend from socket into phototransistor circuit chassis, containing operational amplifiers 83 and resistors 79, 80 and 81, FIG. 22. There are as many photo transistors as fiber optic end and the exposed sensitive surfaces of the photo transistors align with the positions of the fiber optic ends. A partial plan view of board 102 is shown in FIG. 29B. Holes 104 expose the light sensitive surfaces of photo transistors 77, so that the light from an illuminated lamp will activate the semiconductor and cause current to flow in leads 78 and 78', FIG. 29A. FIG. 30 shows a perspective view of a suggested support for lamp socket 73. Donut-shaped disc 99 surrounds socket and makes a tight fit, and legs 106 are cemented to top surface of lamp board 95 so that they are firmly implanted and rigidly held on to the lamp board. Hole 105, at center of holes 98 in a circular pattern, is sufficiently large to permit removal of lamp 88. A cross-sectional view of boards 95, 100 and 102, stacked one on top of the other, would resemble the sectional view shown in FIG. 26. Now, instead of nine rows of lamps with four lamps to a row, as shown in partial schematic diagram FIG. 5, there would be a total of six lamps. The light from each lamp, passing through holes in board 100, illuminating as many as six photo transistors, shown in board 102.

Instead of solderless terminal boards 40 and 41, FIG. 6, a printed circuit board 110, FIG. 31 may be used for the computing circuit module to perform summing or integration of applied signals. The steps in creating a PC board may be found in several textbooks, such as "Printed Circuits Handbook" by C. Coombs, and will not be repeated here. Printed circuits, being a nonwire method of providing conductive paths between components, enable condensation of the whole structure of an electronic assembly. When the components are assembled upon it, as shown in FIG. 31, the PC structure serves simultaneously as a chassis, and the components are rigidly and somewhat permanently soldered to it, instead of the temporary assembly of FIG. 6. Hence, in addition to enabling physical condensation and reduction in equipment size, circuit reliability is increased and production costs decreased. The arrangement of components in FIG. 31, top view of the integrator card, resemble arrangement of those shown in FIG. 6. The copper foil of the printed circuit would be located underneath card 110, shown in view FIG. 33. Wires or leads of components, such as resistors and capacitors, are inserted into predrilled holes of card 110; the connections between the leads and the conductor pattern are soldered, and the excess wire is cut off. Machines are available that will cut the leads to the correct length and bend them to the desired configurations at high speeds. A step beyond is the use of machines that not only prebend and precut but insert the components in the boards. These machines also crimp the leads on the other side of the board to hold the components in place before being dip soldered.

The board itself may be of laminated plastic. Components may be unsoldered and replaced but the configuration of components cannot be changed.

Where conductors cross one another, one of the crossing conductors may be an insulated wire. Bypass capacitors $C_D$ are shown in dashed lines in the layout, FIG. 31. There would be no problem including them on board 110, if desired. These are desirable only if undesirable oscillations of the output signal occur because of their absence.

A side view of the PC board is shown in FIG. 32. The numbers identifying components are the same as those in FIG. 6, SPDT switch 13 is external to the board. FIG. 33 shows a bottom view of the board where the printed circuit pattern appears. Some wires, such as the signal input wires supply voltages $\pm V$, E, ground G, and output signal wires may extend beyond the PC board. These extended wires may be connected to other wires which are insulated by means of jack-to-jack connectors. The jack-to-jack connector is shown in U.S. Pat. No. 3,996,457, dated 12-7-76. Thus, the PC board may be removed without unsoldering wires. The board itself may be attached to brackets 38, similar to terminal strips 40 and 41. Board 110 is attached to brackets 38 with the aid of standoff spacers, not shown, located at hole locations 114. The standoff spacers are desirable to enable any projections at undersurface of board to clear brackets 38.

FIG. 31A is essentially identical to FIG. 8 and is shown here to assist one in following the wiring between components on card 110. To change the circuit, one would substitute board 110 with another, having the desired circuit.

As can be readily seen by examination of the computer and the programming technique, the coefficient - setting potentiometers must be set manually, not by the punched card device. They can be set more accurately with the aid of the digital voltmeter, shown in FIG. 1, than by the numerical value of the ten-turn dials 1P to 10P because the loading effect of the input register, such as $R_1$, on the potentiometer can be included.

One or more digital logic modules to perform AND, OR, NAND, NOR and NOT functions may be substituted for analog circuit modules to enable this computer to perform hybrid functions. The digital logic module could include an interface, an electronic comparator, such as a Fairchild $\mu A710$ T0-5 can, to convert an analog signal into a bi-level signal.

SYMBOLOGY AND TERMINOLOGY AS USED IN FOREGOING SPECIFICATIONS SUBMITTED FOR PURPOSES OF CLARIFICATION

Analog Computer = A computer which represents variables by physical analogies in continuous form, such as amount of voltage. An analog computer measures continuously, whereas a digital computer counts. It will accept information, process it in accordance with a "program" and product answers (outputs) derived from this process.

Amplifier, Operational = d-c integrated-circuit (IC) packaged amplifier as a replacement for any low power amplifier, which has high input impedance and low output impedance and is capable of developing bipolar output signals from bipolar input signals.

Attenuator = A voltage-dividing potentiometer or resistor network for multiplication of a variable voltage by a positive constant whose magnitude is less than unity.

Amplifier, Integrating = An integrated circuit amplifier with a capacitor in the feedback loop to provide an output voltage proportional to the integral of one or more input variables.

Amplitude Voltage Scaling = The constant of proportionality relating a voltage to a physical variable having an estimated maximum value is the scale factor.

Amplifier, Summing = An amplifier with a summing junction at its input at which signal current form input resistors and a feedback resistor are summed. Its output voltage is a linear combination of the input voltages.

Comparator = A differential input amplifier used to compare the voltage levels at its two inputs and having high gain so that only small voltage differences are needed to switch the output voltage from one polarity to the other. To be more specific, it compares the instantaneous value of a signal voltage at one input against a reference voltage on the other input and produces a digital one or zero level at its output depending on which of the two inputs is higher. It may be used to perform any one of the following functions:

1. Variable threshold detector, when the reference is not constant.
2. Pulse-height discriminator.
3. Voltage level comparator for analog to digital conversion.

Gain of Amplifier or System = Ratio of instantaneous magnitudes of output to input voltages.

Operating Mode Controls = The primary operating modes of reset, hold and compute or operate, manually controlled by a threeway switch.

Integrated Circuit = A microcircuit consisting of interconnected elements inseparably associated and formed on or within a single substrate to perform an electronic circuit function.

Microcircuit = A circuit having a high equivalent circuit element density, which is considered as a single part composed of interconnected elements on or within a single substrate to perform an electronic circuit function.

Element = A constituent of a microcurcuit that contributes directly to its operation.

Microcircuit Module = An assembly of microcircuits or an assembly of microcircuits and discrete parts, designed to perform one or more electronic circuit functions. For the purpose of specification testing and maintenance, it is considered invisible.

Computing Module or Component = The basic units of the computer, namely, (1) integrator amplifier, which is capable of summing input voltages, too, (2) Summer Amplifier (3) Inverter or amplifier with a single input, (4) multiplier/divider capable of multiplying or dividing variable voltages and possessing an inherent scale factor.

Computing Module Terminal Strip = A universal breadboarding matrix possessing many solderless, plug-in tie points to accept DIP's, T0-5's, flatpacks and discrete components with solid lead diameters up to 0.032 inches. Each terminal on said strip consists of 4 solderless, plug-in tie points called a "quad": 1 point for component lead, 2 points for input and output connections and 1 point for test probe contact. The strips are designed to be mounted on panels.

DC Voltmeter = a dc micro or milli-ammeter with a fairly large resistance in series so that the maximum expected input voltage will give full scale deflection of the needle.

Debug = To isolate and remove all malfunctions from a computer.

Limiter = A circuit which holds a signal waveform within prescribed amplitude limits.

Patch Cord = Short electrical conductor lead for interconnecting computer modules; the connections are made by inserting ends into jacks.

Momentary-On = In order for switch to be "on" manual pressure must be maintained at switch position.

Patch Panel = Panel having jacks into which patch cords are inserted to make positive electrical connections between points.

Reed Type Miniature Relay = High speed switch containing a light weight contact needle, activated by an excitation voltage for opening or closing a circuit.

Simulation = The representation of physical systems and phenomena by modeling on a computer.

Switch = A device to make or break a circuit or transfer a current from one conductor to another.

Terminal Strip Computing Module = A universal breadboard matrix, designed to be panel-mounted, possessing many solderless plug-in tie points to accept DIP's, T0-5's, flatpacks and discrete components with solid conductor diameters up to, say, 0.032 inch. Each terminal on a strip consists of four solderless plug-in tie points called a "quad" which may be parceled out as follows: 1 point for component lead, 2 points for input and output connections and 1 point for test probe contact.

Hybrid = A mixture of digital and analog computing modules.

Fiber Optic Bundle = Low light loss glass fibers or plastic light guides within a jacket. The fibers may be bent with negligible light loss, simplifying the design of an optoelectronic system, such as the design of a punched card reading device.

P-C Board = Printed circuit board. In etched printed circuits, laminations or sheets of resin, impregnated paper or cloth are sandwiched with a top layer or sheet of foil copper. Conductive circuits are produced by etching away all parts of the copper foil except the drafted pattern making up the conducting paths.

Lag Circuit = A circuit simulated by a first order system in which the output response rise time is controlled by the magnitude of its time constant.

SYMBOLS

C = Capacitor
DIP = Dual-in-line package
H = Hold, a mode in which the integrator outputs remains constant at the last value achieved before entering the hold mode.
I.C. = integrated circuit.
In = Input
J = Junction of amplifier
O = Output
POT = Coefficient potentiometer
R = Resistor
$s$ = Laplace complex variable and operator = $\sigma + j\omega$, where $\sigma$ = real part and $j\omega$ = imaginary part in the s-plane.
$t$ = time
$x$ = Variable, independent
$y$ = Variable, dependent

What is claimed is:

1. A computer comprising a panel including a plurality of computing modules, each comprising a summing amplifier circuit and integrator circuit, and means for connecting the output of one computing module to the input of another computing module and a punched-card means for interconnecting said modules in a preselected manner to solve a predetermined mathematical differential equation and wherein said panel further includes a plurality of coefficient potentiometers, on/off switches and jacks, means for interconnecting selected components for forming an analog model of a physical system;
voltage responsive indicator means;
mode control switching means for
 a. "reset" position and means for setting said integrator circuit to their initial values,
 b. "compute" position and means for setting said integrator circuits to allow an applied voltage to appear at said integrator circuit output,
 c. "hole" position and means for removing the input voltage to said integrator circuits;
whereby a user of said computer can connect desired computing circuits to model and simulate dynamic physical systems whose output response can be observed on said voltage responsive indicating means.

2. A computer structure in accordance with claim 1, wherein said punched card means comprises:
 1. a lamp board having a plurality of lamps emitting light through restricted aperatures;
 2. an adjacent punched card through which the light from said lamps shines through selected holes;
 3. a board containing photoconductive cells adjacent to said punched card, having the same number of cells as lamps and aligned therewith;
said punched card lying in between said other two boards; a voltage amplifier and a relay circuit associated with each of said photoconductive cells, said relay circuit being the means for connecting the output of one selected computing module to the input of another.

3. A computer structure in accordance with claim 2, wherein light from a single lamp is transmitted by way of a plurality of fiber optic light tubes radiating out to as many holes in said lamp board, the end of said tubes terminating at said board so that light from each of said tubes can shine through a hole in said punched card, illuminating said photoconductive cells, thus reducing the number of required lamps by a factor equal to the number of said light tubes emanating from said single lamp.

4. A computer structure comprising a panel containing a plurality of computing modules, consisting of summing amplifier and integrator circuits, a plurality of input and output jacks externel to and associated with each computing module, a plurality of on/off mechanical switches each connected to an input and an output jack of two different said computing modules, a plurality of relays, each connected to an input and an output jack of two different modules; and punched card means for connecting the output of one computing module to the input of another computing module in three different ways:
 a. using a conventional patch cord to insert into one of said input and said output jacks of two different computing modules;
 b. using one os said mechanical switches to connect an input and an output jack of two different computing modules;
 c. using said punched card means to energize one of said relays in order to connect an output jack of two different computing modules;
in order to solve a differential equation; a combination of said ways being desirable for a particular problem by a user of a particular application, such as for a class in mathematics.

5. A computer structure in accordance with claim 1, wherein said plurality of computing modules may consist of a mixture of modules with terminal strips, each having solderless tie-points on which are mounted electronic circuit components to form summing amplifier and integration computing circuits and of modules with printed-circuit cards having the same said components soldered for rugged use, the said solderless tie-points permitting modification of said computing circuits without the use of solder.

6. A computer structure in accordance with claim 1, wherein each of said computing modules is recessed below said panel and means are provided for holding said module rigidly in position, to enable a lower module silhouette to appear on top of said panel, in order to reduce confusion in applying patch cords.

* * * * *

UNITED STATES PATENT AND TRADEMARK OFFICE
CERTIFICATE OF CORRECTION

PATENT NO. : 4,074,113
DATED : February 14, 1978
INVENTOR(S) : Edwin Z. Gabriel

It is certified that error appears in the above-identified patent and that said Letters Patent are hereby corrected as shown below:

Column 8, line 12, delete "performation" and substitute --perforation--.

line 16, delete "phot transistor" substitute --phototransistor-- line 20, delete "hoee" and substitute --hole--.

Column 11, line 15, delete "register" and substitute --resistor--.

Column 14, claim 4, line 32, after "switches", add --,--.

claim 4(b), line 42, delete "os" and substitute --of--.

claim 4(c), line 46, after "an" add --input and an--.

claim 5, line 57, after "circuits" add --,--.

Signed and Sealed this

Twenty-seventh Day of June 1978

[SEAL]

Attest:

RUTH C. MASON
Attesting Officer

DONALD W. BANNER
Commissioner of Patents and Trademarks